W. E. PIPER.
PROCESS FOR ELIMINATING POROSITY IN RUBBER GOODS.
APPLICATION FILED AUG. 27, 1912.
1,164,860.
Patented Dec. 21, 1915.
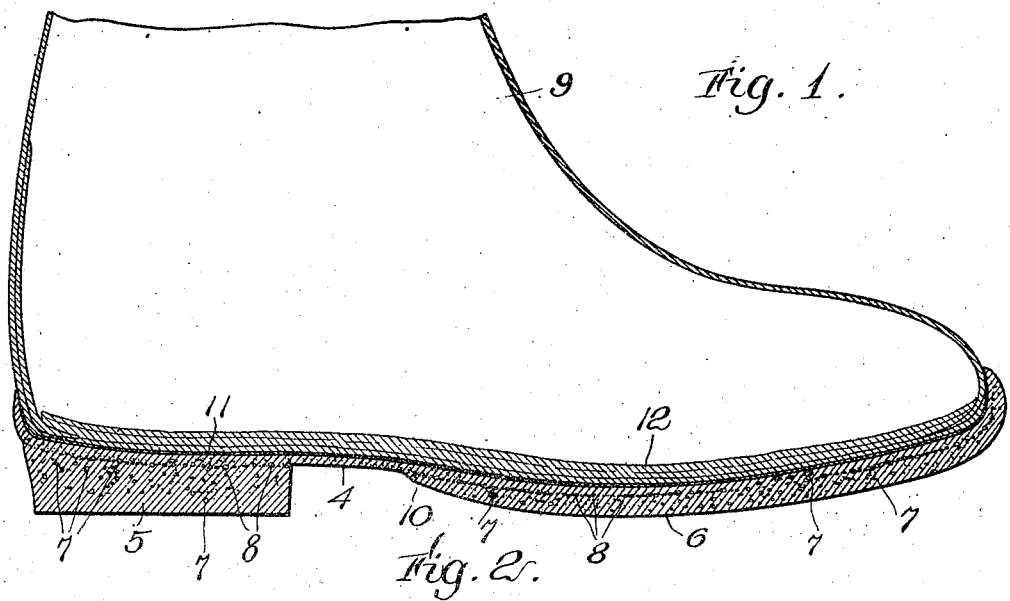
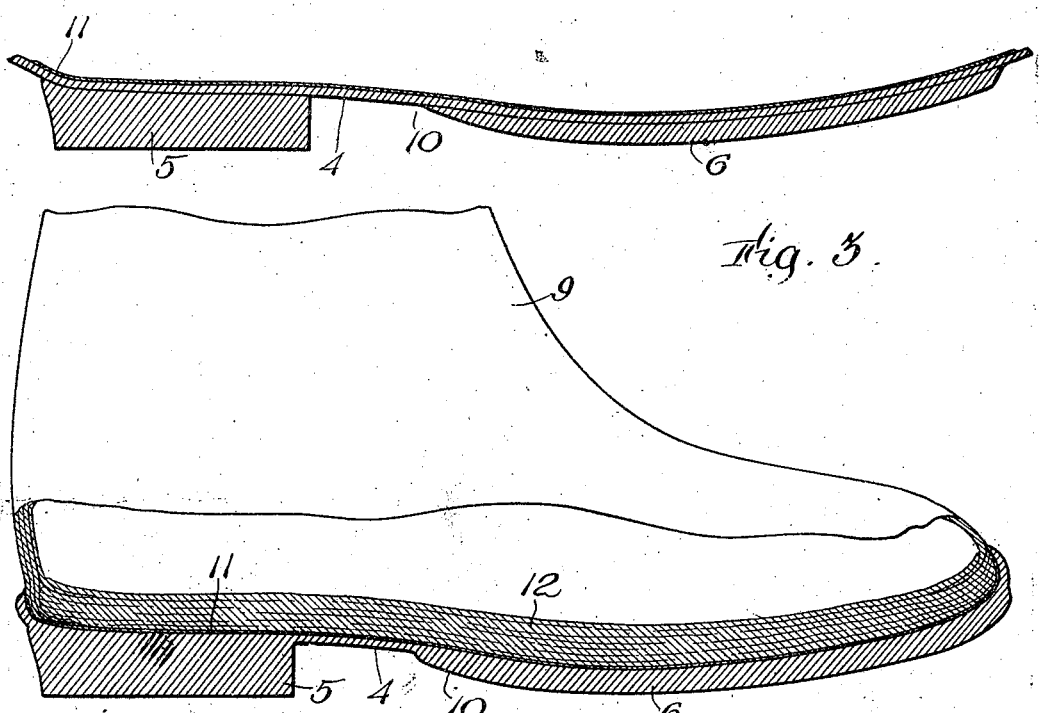
Witnesses:
Herbert Bilodeau
Elizabeth S. O'Connor
Inventor:
Walter E. Piper,
by Everett N. Curtis
Attorney.

UNITED STATES PATENT OFFICE.

WALTER E. PIPER, OF MELROSE, MASSACHUSETTS, ASSIGNOR TO BOSTON RUBBER SHOE COMPANY, A CORPORATION OF MASSACHUSETTS.

PROCESS FOR ELIMINATING POROSITY IN RUBBER GOODS.

1,164,860.      Specification of Letters Patent.      Patented Dec. 21, 1915.

Application filed August 27, 1912. Serial No. 717,370.

*To all whom it may concern:*

Be it known that I, WALTER E. PIPER, a citizen of the United States, residing at Melrose, in the county of Middlesex and State of Massachusetts, have invented new and useful Improvements in Processes for Eliminating Porosity in Rubber Goods, of which the following is a specification.

My invention relates to methods for eliminating porosity in rubber goods and rubber stock and the doing away with blisters or bubbles between the layers and in the layers before the goods are vulcanized; and its objects are to manufacture rubber goods in which rubber is of uniform consistency, solidity and great strength, to economize the time and effort necessary to produce this result and to produce an article of great durability and wearing qualities.

My invention consists primarily in subjecting the rubber parts of which the article is composed, after the same have been assembled and before vulcanization has taken place, to a low temperature for a period of time sufficient to eliminate any air bubbles, moisture, naphtha vapors or any volatile substances or blisters which may be present in the stock, and thereby to produce solidity and uniformity throughout the mass of the rubber.

My invention further consists in the various modifications and improvements more particularly hereinafter pointed out and claimed.

I have found my invention of particular advantage in the manufacture of rubber footwear where one of the greatest difficulties heretofore encountered has been to produce uniformly solid bottoms for boots and shoes, especially where these bottoms are thick, or built up of different layers of stock.

Since the rubber industry began, constant effort has been expended to devise some means of producing sheets of stock over about twenty-five thousandths of an inch in thickness that would be always solid and free from blisters after the sheets were vulcanized. Outside of my process this has been possible to a limited degree only, by vulcanizing them under pressure, an expensive proceeding and uncertain in results. Where such pressure is employed, the effect is to confine the volatile fluids in the stock and to limit their expansion by compression.

It is the purpose of my invention, however, to free the rubber articles from such fluids, and their tendency to form gaseous cells and blisters before vulcanization has taken place.

I have experimented extensively with various processes for the last fourteen years. I have found from my experience that the vulcanization of rubber depends upon the temperature, time, pressure, and percentage of sulfur present in the rubber to be vulcanized. In order to accomplish a certain specific result, the other factors being alike, a definite number of heat units must be introduced in the rubber compound to accomplish vulcanization. These may be introduced gradually and slowly as in the regular dry heat process, which has been in use for sixty years, or they may be introduced suddenly and in a very much shorter time by placing the goods in receptacles under pressure and working at higher temperatures. Where the latter condition exists, there is very much greater danger of damaging the resulting product by over-vulcanization, than with the well established slower method.

In steam pressure-cured goods, the tendency to crack and grow brittle upon exposure to the air is very much greater than it is with goods vulcanized by the regular slow method where the temperature is under better control and vulcanization is not carried out at such a high temperature or under steam pressure. Pressure, as is well known, increases the rate of most chemical reactions.

I believe myself to have been the first person to have discovered that it is not necessary to apply pressure at all, and thus I am enabled to dispense with the expensive form of apparatus required for the purpose, and to use an ordinary dry room during the preliminary heat of the rubber articles produced by this process. By heating at a low temperature, even in atmospheric air, I have found that there is but little danger of oxidation, and that in fact, better results are hereby attained.

In the ordinary course of manufacture, shoe bottoms are usually made of three distinct parts,—first, what is known as the plain sole; second, the tap, which is secured to the forward part of said sole; and third, the heel, which is secured to the heel portion of said sole, adhesives being employed to secure the aforesaid parts. In assembling the parts, great care has heretofore been exercised to prevent air bubbles or blisters occurring at the line of union of the same, and even with the greatest caution I have found that it is impossible wholly to prevent air bubbles or blisters occurring between the surfaces of the various parts. Then again, in the joining of the heel to the sole, although great care is used to prevent air bubbles or blisters occurring between the heel and the sole, it has been found practically impossible to eliminate completely by ordinary processes these bubbles. So also, in the formation of the plain sole and the tap, several layers of rubber stock are used, and it is a matter of common observation that even with the thickness of the taps and plain soles usually employed, air bubbles and blisters, though of small proportions, will constantly occur.

After the bottom has been assembled as above set forth, it is the common practice to affix the same to the rubber boot or shoe by means of some good adhesive and the completed product is then placed in a closed chamber to be vulcanized, where the said product is heated for five or six hours at a gradual increase of temperature from about two hundred degree to about two hundred sixty-five degrees Fahrenheit. As a result of such heating at such high temperature, any bubbles or minute air cells or blisters which may be present in the product are caused to expand to a considerable extent and to cause porosity in the body of the various component parts of bottoms as above described, and also enlarged blisters in or between the same. While by using exceedingly good care and by giving strict attention to temperatures the porosity and blisters may be considerably lessened, it is practically impossible through the use of present processes to eliminate the same altogether and therefore a great many "seconds" are produced where such porosity or blisters become apparent on the outside of the rubber boot or shoe. In the factories of most manufacturers of rubber boots and shoes a large percentage of "seconds" is due to porosity or blisters; and in many of the factories in consequence of the demand of the trade, rubber heels are nailed through the bottom stock in order to prevent their coming loose from the boot or shoe because of porosity or blisters occurring between the top of the heel and the plain sole and in the plain sole.

My invention I believe entirely eliminates the production of "seconds" so far as is concerned porosity or blisters in the stock.

Porosity or blisters are objectionable because of the fact that the wearing qualities of the shoe are greatly impaired that where blisters occur between the tap and the sole or the heel and the sole, the soles and the heels are likely to become detached and that even where the best stock is used, the enduring qualities of the same are not made so available as in articles produced through my new and improved process. Then again, with the present processes used in the manufacture of rubber boots and shoes, there is a marked difference in the quality of the bottom between that manufactured in summer when the temperature and humidity are high and in the winter when lower temperatures and less humidity prevail; it being recognized among rubber shoe manufacturers that by reason of such high temperatures and humidity in the summer time, bubbles and porosity are much more likely to occur in the work than in the other seasons of the year when temperature and humidity are lower.

The chief advantages of my new process are, first, that a uniform result in all shoe bottoms, whether made of better or cheaper material is obtained; second, that there are no "seconds" from porosity or blisters; third, that no separations occur of the heel or tap and the sole due to defective heel or tap or sole making; fourth, that the wearing qualities of the shoe bottom are bettered to an extent of double that of the ordinary shoe bottom; fifth, that a much better article can be made out of cheaper stock than heretofore; sixth, that my process can be applied to all grades of rubber footwear; seventh, that my process can be used to advantage in all arts where it is found desirable to make solid rubber stock; eighth, that no great expenditure of money or time is necessary in utilizing my process; and ninth, that my process, as is obvious, can be used in other ways and manners.

Attention is hereby directed to the drawing in which similar numerals of designation refer to similar parts throughout the several views.

Figure 1 is a longitudinal section of a rubber boot or shoe such as is commonly now sold on the market showing porosity and blisters in the shoe bottom. Fig. 2 is a longitudinal section of a shoe bottom before the same has been subjected to my process. Fig. 3 is a longitudinal section of a shoe to which the sole shown in Fig. 2 has been applied after having been subjected to my process and showing the uniform character of the shoe bottom.

Referring to the drawing,—to the plain rubber sole 4, I affix, by means of some good adhesive, the rubber heel 5, and the rubber tap 6 to the under portion thereof. Upon the upper surface of said plain sole 4, I affix the "form" of frictioned sheeting 11. These parts so assembled constitute what is termed in the art as the bottom and I have designated the same as an entirety by the numeral 10. Where a bottom is constructed of a single sole, then as is obvious the heel 5 and the tap 6 may be dispensed with and the exposed surface of said sole knurled or corrugated in any of the ways well known in the art of manufacturing rubber boots and shoes. By the term bottom, therefore, I desire to be understood as referring to any and all structures of rubber which serve as a wearing surface for the boot or shoe. In securing the said parts it has heretofore been necessary to exercise great care to prevent the formation of blisters between the parts when the same are secured together, since any such bubbles or blisters render a joint insecure and prevent a firm union of the parts; but with my process such a degree of care is unnecessary.

After the parts composing the bottom have been assembled, as above described, I then place the same in a chamber where the bottoms are subjected to a relatively low temperature sufficient to eliminate all air, naphtha and other gases which may be in the stock for various causes or which may be between the layers of stock as above referred to. By actual experiment for a period of over six months I have found that the temperature which is the most advantageous for my process is between one hundred thirty and one hundred thirty-five degrees Fahrenheit and that about thirty-six hours is the time required. Care has to be exercised that the temperature is not carried to such an extent as to produce vulcanization.

The temperature which I employ, I have found bears within certain limits a ratio to the period of time during which the shoe bottom is warmed or heated. In other words, a temperature lower than between one hundred and thirty and one hundred thirty-five degrees Fahrenheit may be employed provided that the shoe is heated a correspondingly longer period of time but the range of temperature which is amenable to my process is comparatively small so that the corresponding period of time needed when a lower or higher temperature is employed than between one hundred thirty and one hundred thirty-five degrees Fahrenheit is not great. I have found by experiment that the most advantageous results secured as above stated are when the temperature is between one hundred and thirty and one hundred thirty-five degrees Fahrenheit.

After the bottoms have been subjected to the steps of my process as described above, they are then secured to the layers 12 of the upper 9 of the rubber shoe or boot in the ordinary manner, and the entire shoe or boot is placed in the vulcanizing chamber and the shoe is vulcanized. After vulcanization has taken place, I have found that the shoe bottoms are a solid product, and that there are substantially no blisters or bubbles between the layers and substantially no porosity in the rubber itself.

In the usual course of manufacture I have found it more economical, where a single rubber shoe sole was used, to subject the stock before said shoe soles are cut out to the process above described; but I also have produced good results by treating the said shoe soles after they have been cut. In the case of bottoms for solid heel goods, which have a plain sole and tap and a heel as above described, I find that I obtained the best results after the bottoms have been assembled. The essence of my invention, or discovery, resides in the fact that in the process the gases and volatile fluids are substantially expelled before vulcanization, without the use of pressure; and at the same time causing the particles of the stock to come closely together; so that after vulcanization, the resulting product is solid, non-porous.

While I have described my invention with particular reference to the manufacture of boots and shoes, I do not desire to limit the same to such application, it being obvious that my invention could be used to advantage with any sort of rubber article or product where a uniformly solid mass of rubber was desired.

What I claim and desire to secure by Letters Patent is,—

1. A process for producing a uniformly solid rubber bottom for a rubber shoe, consisting in forming a shoe bottom to substantially its final form directly from calender-sheeted vulcanizable plastic and in heating said bottom subsequent to its formation at a temperature below that of vulcanization, and atmospheric pressure irrespective of that which may be due to the surrounding air and gases caused by said temperature until all fluids occasioning porosity in said stock have been substantially removed, and thereafter vulcanizing said bottom.

2. A process for producing a uniformly solid rubber bottom for a rubber shoe, consisting in constructing a shoe bottom directly of layers of calender-sheeted vulcanizable plastic to substantially its final form, and in heating said shoe bottom subsequent to its formation at a temperature below that of vulcanization, and atmospheric pressure irrespective of that which may be due to the expansion of the surrounding air and gases caused by said temperature until all fluids occasioning porosity in the joints and layers of said bottom have been substantially removed, and thereafter vulcanizing said bottom.

3. A process for producing a uniformly solid rubber bottom for a rubber shoe, consisting in assembling the parts of a shoe bottom constructed of calender-sheeted vulcanizable plastic to substantially its final form and then subjecting the same subsequent to its formation at atmospheric pressure irrespective of that which may be due to the expansion of the surrounding gases caused by the surrounding temperature to a degree of heat during a period of time sufficient to expel the free gases in said bottom without vulcanizing the same, and thereafter subjecting the completed structure to vulcanization.

4. A process for producing a uniformly solid rubber bottom for a rubber shoe, consisting in constructing a bottom of calendered rubber, and then subjecting the same prior to vulcanization at atmospheric pressure to a temperature approximately 130 degrees Fahrenheit during a period of time approximately 36 hours, and thereafter vulcanizing the same.

In testimony whereof I have hereunto set my hand in presence of two subscribing witnesses, this 24th day of August 1912.

WALTER E. PIPER.

Witnesses:
ROBERT JACKSON CRAM,
ELIZABETH S. O'CONNOR.